United States Patent

[11] 3,612,644

| [72] | Inventor | Francis H. Stites<br>Wayland |
|---|---|---|
| [21] | Appl. No. | 52,302 |
| [22] | Filed | July 6, 1970 |
| [45] | Patented | Oct. 12, 1971 |
| [73] | Assignees | Robert H. Reif<br>Groton, both of, Mass.;<br>Sylvania Electric Products, Inc. |

[54] OPTICAL SCANNER FOR RETROREFLECTIVE LABELS
5 Claims, 3 Drawing Figs.

[52] U.S. Cl. ....................................... 350/7, 235/61.115
[51] Int. Cl. ....................................... G02b 17/08
[50] Field of Search ............................ 350/7, 172, 6; 235/61.115; 250/234, 235, 236; 178/6.8

[56] References Cited
UNITED STATES PATENTS
3,456,997  7/1969  Stites et al. ................... 350/7

*Primary Examiner*—David Schonberg
*Assistant Examiner*—John W. Leonard
*Attorneys*—Norman J. O'Malley, Elmer J. Nealon and Peter Xiarhos ABSTRACT: An optical scanning apparatus for scanning a retroreflective label affixed to an object such as a vehicle. An elongated cylindrical rod having a diagonally cut elliptical end region and a small elliptical mirror secured to the diagonally cut end region is positioned intermediate a high-intensity light source and a rotating wheel having a plurality of reflective mirror surfaces around its periphery. An incident light beam produced by the light source surrounds the cylindrical rod, the cross-sectional area of which is significantly less than the cross-sectional area of the incident light beam, and strikes the reflective mirror surfaces of the rotating wheel in succession. The reflective mirror surfaces reflect the incident beam onto the retroreflective label which, in turn, retroreflects the incident beam back onto the reflective mirror surfaces. The reflective mirror surfaces then reflect the retroreflected beam toward the small elliptical mirror and a portion of the beam, constituting the most intense and desirable portion of the beam, is reflected by the small elliptical mirror to an electrooptical processing arrangement for further processing.

INVENTORS
ROBERT H. REIF
FRANCIS H. STITES

BY Peter Xiarhos

OPTICAL SCANNER FOR RETROREFLECTIVE LABELS

BACKGROUND OF THE INVENTION

The present invention relates to optical scanning apparatus and, more particularly, to optical scanning apparatus for scanning a coded retroreflective label affixed to an object such as a vehicle.

Various systems and apparatus are known for optically scanning coded retroreflective labels affixed to vehicles or to other objects presented to a label-reading station. An exemplary optical scanning apparatus for scanning coded retroreflective levels on railway vehicles, for example, railroad cars, is described in detail in U.S. Pat. No. 3,456,997 to Stites et al., assigned to the same assignee as the present application. As disclosed in the above-mentioned patent, the optical scanning apparatus includes a light source, a rotating wheel having a plurality of reflective mirror surfaces around its periphery, and a partially silvered mirror optically interposed between the light source and the mirror wheel and having a small unsilvered portion at its center.

In the operation of the above-described optical scanning apparatus, when a vehicle having a coded retroreflective label affixed thereto passes by the optical scanning apparatus, an incident beam of light from the light source is directed onto the partially silvered mirror and reflected by the silvered portion thereof onto the reflective mirror surfaces of the rotating wheel. The light striking the reflective mirror surfaces of the rotating wheel is swept by the mirror surfaces across the coded retroreflective label and then retroreflected by the label back along the path of the incident light onto the reflective mirror surfaces of the rotating wheel. The retroreflected light striking the reflective mirror surfaces is reflected thereby toward the partially silvered mirror and a portion of such light passes through the small unsilvered portion of the partially silvered mirror and is received by an electro-optical processing assembly optically aligned with the unsilvered portion of the partially silvered mirror. The electro-optical processing assembly operates in response to the light passing through the unsilvered portion of the partially silvered mirror to provide electrical signals representative of the information encoded in the retroreflective label. The electrical signals are then processed by scanning and decoding logic circuits.

Although the above-described optical scanning apparatus operates for the most part in an efficient and effective manner, it sometimes occurs that a portion of the light produced by the light source during a label scanning operation undesirably escapes past the edges of the partially silvered mirror and also through the unsilvered portion of the partially silvered mirror. This light is undesirably scattered back toward the rear surface of the partially silvered mirror and into the electro-optical processing assembly by means of various operationally unrelated reflective surfaces or objects in the path of the stray light from the light source. The effects of the scattered light reaching the electro-optical processing assembly is to increase the noise level of the electro-optical processing assembly and possibly to cause the electro-optical processing assembly to produce and apply spurious electrical output signals to the scanning and decoding logic circuits.

BRIEF SUMMARY OF THE INVENTION

Briefly, in accordance with the present invention, an optical scanning apparatus is provided for a system for reading a radiation-reflecting label, for example, a retroreflective label. The optical scanning apparatus of the invention comprises a rotatable means supporting a plurality of radiation-reflecting elements on the periphery thereof, a source of electromagnetic radiation for producing an incident beam of electromagnetic radiation, and an elongated optical member disposed intermediate the source of electromagnetic radiation and the rotatable means in the path of the incident beam produced by the source of electromagnetic radiation. In accordance with the present invention, the elongated member has a cross-sectional area of the incident beam of electromagnetic radiation produced by the source of electromagnetic radiation and further has an end region remote from the source of electromagnetic radiation cut diagonally at a predetermined angle. A radiation-reflecting receiving element is disposed on the diagonally cut end region of the elongated member.

In the operation of the above-described apparatus, an incident beam of electromagnetic radiation produced by the source of electromagnetic radiation is directed by the source of electromagnetic radiation onto the radiation-reflecting elements on the periphery of the rotatable means. The incident beam is reflected by the radiation-reflecting elements onto a radiation-reflecting label. The incident beam striking the radiation-reflecting label is reflected by the label back onto the radiation-reflecting elements on the periphery of the rotatable means and then toward the radiation-reflecting receiving element on the diagonally cut end region of the elongated member. With the above arrangement of elements, the radiation-reflecting receiving element receives electromagnetic radiation at the center of the beam of electromagnetic radiation reflected by the radiation-reflecting label, after reflection by the radiation-reflecting elements on the rotatable means, and then reflects this electromagnetic radiation to an electromagnetic-radiation processing arrangement for processing by the electromagnetic-radiation processing arrangement.

BRIEF DESCRIPTION OF THE DRAWING

Various object, features, and advantages of an optical scanning apparatus in accordance with the invention will be apparent from the following detailed discussion and the accompanying drawing wherein.

DESCRIPTION OF PRIOR ART OPTICAL SCANNING APPARATUS

FIG. 1

Figure 1:
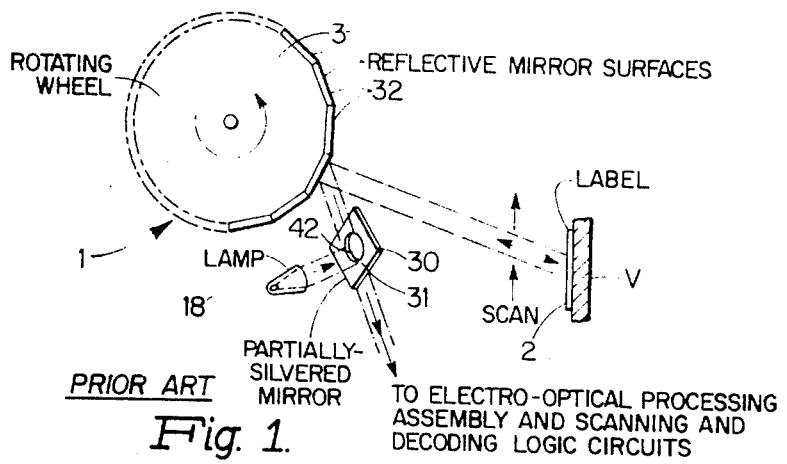
FIG. 1 is a perspective view of the afore-described prior art optical scanning apparatus for scanning a coded retroreflective label affixed to a vehicle.

Referring to FIG. 1, there is shown a perspective view of a prior art optical scanning apparatus 1, described in detail in U.S. Pat. No. 3,456,997, to Stites et al., for scanning a coded retroreflective label 2 affixed to a moving vehicle V, for example, a conventional railroad car. As shown in FIG. 1, the optical scanning apparatus 1 comprises a rotating wheel 3 having a plurality of reflective mirror surfaces 32 on its periphery, a lamp 18, and a partially silvered mirror 30 having a silvered portion 31 and an unsilvered elliptical portion 42 at the center thereof. Although reference may be made to the above-cited patent to Stites et al. for a detailed description of the operation of the optical scanning apparatus 1, for purposes of a fuller understanding of the present invention, a brief description of the operation will be presented.

As the vehicle V bearing the coded retroreflective label 2 is presented to the optical scanning apparatus 1, an incident beam of light from the lamp 18 is reflected by the silvered portion 31 of the partially silvered mirror 30 onto the reflective mirror surfaces 32 of the rotating wheel 3. The light received by the reflective mirror surfaces 32 is further reflected onto the label 2 upon a rotation motion being imparted to the rotating wheel 3 by a suitable motor (not shown). To insure optimum operation of the optical scanning apparatus 1 and associated apparatus, the lamp 18, the partially silvered mirror 30, and the rotating wheel 3 are positioned with respect to each other such the incident light rays directed onto the label 2 appear in vertical planes forming small angles of approximately 12°–15° with respect to associated vertical planes normal to the surface of the label 2. As discussed in the aforementioned patent to Stites et al., the range of angles 12°-15° is preferred because of characteristics of the particular retroreflective material used, for example, "Scotchlite," which permits incident light directed thereon at an angle of 12°-15 to be reflected therefrom with optimum efficiency. "Scotchlite" is a trademark of the 3M Company, St. Paul, Minn.

The light directed onto the label 2 is retroreflected thereby along the path of the incident light. The retroreflected light is returned onto the reflective mirror surfaces 32 of the rotating wheel 3, and a portion of the retroreflected light is reflected by the mirror surfaces 32 through the unsilvered elliptical portion 42 of the partially silvered mirror 30. The unsilvered elliptical portion 42 presents a circular transmission path for the light reflected from the label 2 since the diagonal arrangement of the partially silvered mirror 30 converts the ellipse to an effective circle with respect to the light path. The light passing through the unsilvered elliptical portion 42 of the partially silvered mirror 30 is applied to an electro-optical processing assembly (not shown) which is optically aligned with the path of the light passing through the unsilvered elliptical portion 31 and processed thereby to produce electrical signals representative of the information encoded in the label 2. The electrical signals are then applied to scanning and decoding logic circuits for further processing.

Although the particular physical arrangement of the elements shown in FIG. 1 has proven for the most part to be effective in scanning a retroreflective label and in processing the light retroreflected by the label, it sometimes occurs that a portion of the light produced by the lamp 18 and directed toward the silvered portion 31 of the partially silvered mirror 30 escapes past the edges of the partially silvered mirror 30 and also through the unsilvered portion 42 and is undesirably scattered back toward the rear of the partially silvered mirror 30 and into the electro-optical processing assembly by various operationally unrelated reflective surfaces and objects proximate to the partially silvered mirror 30. By way of example, these reflective surfaces and objects may include the interior surfaces of the enclosure in which the optical scanning apparatus 1 is housed, various metal electrical circuit chassis also housed within the enclosure, and, in general, a variety of electrical and mechanical components and structures such as are commonly employed in the construction of a fully operational trackside label-reading system. The effects of the scattered light reaching the electro-optical processing assembly is to cause the noise level of the electro-optical assembly to increase and possibly to cause the electro-optical assembly to produce and apply spurious electrical output signals to the scanning and decoding logic circuits.

DESCRIPTION OF THE PRESENT INVENTION

FIGS. 2-3

Figure 2:
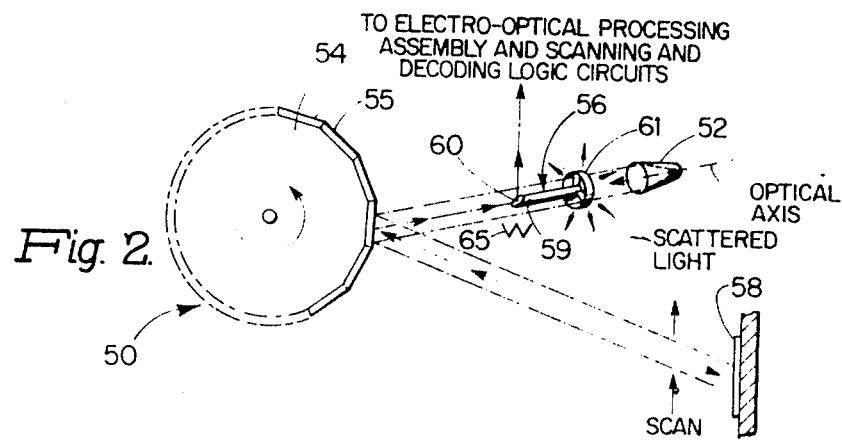
FIG. 2 is a perspective view of an optical scanning apparatus in accordance with the present invention.

The above-described light-scattering problems associated with the prior art optical scanning apparatus 1 of FIG. 1 are substantially reduced in accordance with the present invention by means of an optical scanning apparatus such as shown at 50 in FIG. 2. As shown in FIG. 2, the optical scanning apparatus 50 comprises a lamp 52, a rotating wheel 54 having a plurality of reflective mirror surfaces 55 around its periphery, and a receiver mirror arrangement 56 disposed along the optical axis of the lamp 52 intermediate the lamp 52 and the rotating wheel 54. The lamp 52, the receiver mirror arrangement 56, and the rotating wheel 54 are positioned with respect to each other such that each incident light ray emitted by the lamp 52 and moving past the receiver mirror arrangement 56 strikes one of the reflective mirror surfaces 55 of the rotating wheel 54 at an angle of approximately 12°-15° with respect to a vertical plane normal to the reflective mirror surface. In this fashion, the incident light ray is reflected by the reflective mirror surface onto a retroreflective label, such as shown at 58 in FIG. 2, at an angle of approximately 12°-15° with respect to a vertical plane normal to the surface of the label 58. As stated previously in connection with the discussion of the prior art optical scanning apparatus 1 of FIG. 1, the range of angles of 12°-15 is preferred because of characteristics of the particular retroreflective material used, for example, "Scotchlite," which permits incident light directed thereon at an angle of 12°-15 to be reflected therefrom with optimum efficiency.

Figure 3:
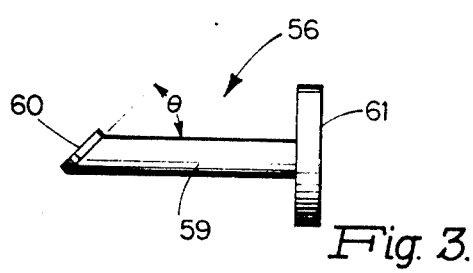
FIG. 3 is a side view of a receiver mirror arrangement employed in the optical scanning apparatus in accordance with the present invention.

The receiver mirror arrangement 56 comprises an elongated rod 59 having a diagonally cut end region, shown more clearly in the side view of FIG. 3, a small mirror 60 secured to the diagonally cut end region, and a support structure 61 attached to the opposite end region of the rod 59. The support structure 61, which is employed to support the rod 59 in the light beam produced by the lamp 52, may take the form of a spider assembly, such as shown in FIG. 2, or any other suitable construction which does not significantly interfere with the passage of light from the lamp 52 around the rod 59. As will become apparent hereinafter, the elongated rod 59 serves to keep the small mirror 60 a safe distance away from the lamp 52, for example, 3 inches, thereby to prevent light from the lamp 52, particularly scattered light, from undesirably striking the mirror 60 and causing improper operation of the electro-optical processing assembly and the scanning and decoding logic circuits.

Although the mirror 60 and the rod 59 may each have a variety of possible physical configurations, to minimize undesirable reflecting surfaces and to otherwise achieve optimum performance of the optical scanning apparatus 50 and associated apparatus, it is preferred that the rod 59 have a cylindrical configuration and that the mirror 60 have an elliptical configuration conforming to and of the same size as the elliptically shaped, diagonally cut end region of the rod 59. In addition, it is desirable that the rod 59 typically of glass, plastic, or metal, and the associated supporting structure 61, also typically of glass, plastic, or metal, be painted with a black nonreflecting paint to further minimize reflections therefrom. To prevent excessive blocking of the light emitted by the lamp 59, the rod 59 should have a cross-sectional area which is significantly less than the cross-sectional area of the incident light beam produced by the lamp 52. By way of example, the rod 59 may have a typical diameter of one-quarter inch as compared with a typical diameter of the incident light beam of 1 inch, these values resulting in a 16:1 difference between the cross-sectional area of the light beam and the cross-sectional area of the rod 59. A particularly convenient angle for the diagonally cut end region of the rod 59, designated as $\theta$ in FIG. 3, is 45°, although other angles between 15° and 75° may also be used provided the electro-optical processing assembly is aligned along the axis of light reflected from the mirror 60. A particularly suitable light source which may be employed in the optical scanning apparatus 50 in accordance with the present invention is a miniature, high-intensity, short-arc xenon illuminator manufactured and sold by the Eimac Division of Varian Associates, San Carlos, Calif., under the designation 150×85.

The operation of the above-described optical scanning apparatus 50 to scan the retroreflective label 58 is as follows. When the label 58 is presented to the optical scanning apparatus 50, an incident light beam is produced by the lamp 52 which envelops the receiver mirror arrangement 56 and strikes the reflective mirror surfaces 55 of the rotating wheel 54. Each incident light ray emitted by the lamp 52 and moving past the receiver mirror arrangement 56 strikes one of the reflective mirror arrangement 56 strikes one of the reflective mirror surfaces 55 of the rotating wheel 54 at an angle of approximately 12°-15° with respect to a vertical plane normal to the reflective mirror surface whereby the incident light ray is reflected by the reflective mirror surface onto the label 58 at an angle of approximately 12°-15°. The light directed onto the label 58 is retroreflected by the label 2 along the path of the incident light and returned to the reflective mirror surfaces 55 of the rotating wheel 54, and then to the mirror 60, the light retroreflected by the retroreflective label 58 being returned to the mirror surfaces 55 and to the mirror 60 in the form of a divergent cone. A portion of the light reflected from the reflective mirror surfaces 55, constituting the central and most intense and desirable portion of the light beam retroreflected by the label 58, is received by the mirror 60 and reflected thereby to the electro-optical processing assembly aligned with the axis of the light reflected from the mirror 60. The light reflected from the mirror 60 is then processed by the electro-optical processing assembly and the scanning and decoding logic circuits, as previously mentioned. It is to be noted that any light from the lamp 52 which is scattered by the end of the rod 59 close to the lamp 52, and/or by its supporting structure 61, is substantially prevented from reaching the mirror 60 by virtue of the mirror 60 being spaced by the rod 59 at a safe distance away from the point of the scattered light. In certain application of the optical scanning apparatus 50, however, it may be desirable to employ a light trap, such as shown schematically at 65 in FIG. 2, to absorb various spurious light reflections which may appear in the vicinity of the mirror 60.

Modifications

Although an optical scanning apparatus has been disclosed for scanning retroreflective labels with visible light, it is to be appreciated that such apparatus may also be employed for scanning other types of light-reflecting labels and may employ forms of electromagnetic radiation other than visible light. Other changes and modifications will also be obvious to those skilled in the art without departing from the invention as called for in the appended claims.

What is claimed is:

1. In a system for reading a retroreflective label, optical scanning apparatus comprising:

rotatable means supporting a plurality of mirror elements on the periphery thereof for reflecting an incident beam of light directed thereon onto a retroreflective label and for receiving and reflecting a beam of light reflected from the retroreflective label in response to the incident beam of light;

a source of light arranged to produce and direct an incident beam of light onto said mirror elements in succession whereby the incident beam of light is reflected from the mirror elements onto said retroreflective label;

an elongated member disposed intermediate the source of light and the rotatable means along the optical axis of the source of light and in the path of the incident beam of light produced by the source of light, said elongated member having a cross-sectional area small compared to the cross-sectional area of the incident beam of light produced by the source of light said cross-sectional area of the elongated member having a value permitting passage of a major portion of the incident beam of light produced by the source of light to the mirror elements on the rotatable means, and said elongated member having an end region remote from the source of light facing the rotatable means, and cut diagonally at a predetermined angle; and a mirror receiving element disposed on the diagonally cut end region of the elongated member whereby said mirror receiving element receives light at the center of the beam of light reflected by the retroreflective label after being reflected by the mirror elements on the rotatable means, said mirror receiving element reflecting said light to a light processing arrangement for process processing by said light processing arrangement.

2. Optical scanning apparatus in accordance with claim 1 wherein:

the elongated member has a cylindrical configuration and the diagonally cut end region has an elliptical configuration; and the mirror receiving element has an elliptical configuration and is of the same size as the elliptical diagonally cut end region of the elongated member.

3. Optical scanning apparatus in accordance with claim 2 wherein the source of light includes a high-intensity, short-arc, xenon illuminator.

4. Optical scanning apparatus in accordance with claim 5 wherein the elongated member is coated with a nonreflecting paint.

5. Optical scanning apparatus in accordance with claim 4 further comprising a light trap located proximate to the mirror receiving element.

PO-1050
(5/69)

UNITED STATES PATENT OFFICE
CERTIFICATE OF CORRECTION

Patent No. 3,612,644     Dated October 12, 1971

Inventor(s) Francis H. Stites and Robert H. Reif

It is certified that error appears in the above-identified patent and that said Letters Patent are hereby corrected as shown below:

In the heading of the patent, in the second line of the section designated "[72]", after "Wayland", insert --, and Robert H. Reif, Groton, both of Mass.--; in the section of the heading designated "[73]" change "Assignees" to-- Assignee--and delete "Robert H. Reif Groton, both of, Mass.;--

Column 1, last line, after "area", insert--which is smaller than the cross-sectional area of--

Column 3, line 6, change "15" to--15°--

Column 4, lines 5 and 8, change "15" to--15°--; line 57, change "x" to--X--; lines 66 and 67, delete "strikes one of the reflective mirror arrangement 56"

Column 5, line 17, change "application" to--applications--

In claim 1, column 6, line 23, delete "process"

In claim 4, column 6, line 36, change "5" to--3--

Signed and sealed this 2nd day of May 1972.

(SEAL)
Attest:

EDWARD M. FLETCHER, JR.
Attesting Officer

ROBERT GOTTSCHALK
Commissioner of Patents